United States Patent
Lee et al.

(10) Patent No.: US 7,995,156 B2
(45) Date of Patent: Aug. 9, 2011

(54) METHOD OF MANUFACTURING A DISPLAY SUBSTRATE USING A LASER TO REMOVE TEST LINES FROM THE SUBSTRATE WITHOUT CUTTING THE SUBSTRATE

(75) Inventors: Kun-Jong Lee, Seoul (KR); Chan-Hyang Lim, Yongin-si (KR); Min-Young Won, Yongin-si (KR); Won-Hee Lee, Seoul (KR); In-Cheol Song, DaeJeon (KR)

(73) Assignee: Samsung Electronics Co., Ltd. (KR)

( * ) Notice: Subject to any disclaimer, the term of this patent is extended or adjusted under 35 U.S.C. 154(b) by 135 days.

(21) Appl. No.: 11/218,818

(22) Filed: Sep. 2, 2005

(65) Prior Publication Data

US 2006/0050194 A1    Mar. 9, 2006

(30) Foreign Application Priority Data

Sep. 7, 2004   (KR) ........................ 10-2004-0071295

(51) Int. Cl.
    *G02F 1/13*        (2006.01)
    *G02F 1/1333*     (2006.01)
    *G01R 31/26*      (2006.01)

(52) U.S. Cl. ..... 349/54; 349/187; 349/192; 324/760.01; 324/760.02

(58) Field of Classification Search ................... 324/770, 324/760.01, 760.02; 349/54, 55, 187, 192, 349/152
See application file for complete search history.

(56) References Cited

U.S. PATENT DOCUMENTS

| | | | | |
|---|---|---|---|---|
| 5,668,032 A | * | 9/1997 | Holmberg et al. | 438/149 |
| 6,496,234 B1 | * | 12/2002 | Lee | 349/40 |
| 6,714,269 B1 | * | 3/2004 | Huang | 349/54 |
| 2001/0020988 A1 | * | 9/2001 | Ohgiichi et al. | 349/54 |
| 2002/0008795 A1 | * | 1/2002 | Koyama et al. | 349/42 |
| 2002/0027629 A1 | * | 3/2002 | Choo et al. | 349/122 |
| 2002/0044250 A1 | * | 4/2002 | Yoo et al. | 349/149 |
| 2004/0119925 A1 | * | 6/2004 | Moon | 349/139 |
| 2004/0124869 A1 | * | 7/2004 | Lee et al. | 324/770 |
| 2005/0146349 A1 | * | 7/2005 | Lai et al. | 324/770 |

FOREIGN PATENT DOCUMENTS

| | | |
|---|---|---|
| JP | 1999-510271 A | 9/1999 |
| KR | 1999-0047650 A | 7/1999 |

\* cited by examiner

*Primary Examiner* — Jessica M Merlin
(74) *Attorney, Agent, or Firm* — Innovation Counsel LLP

(57) ABSTRACT

A display substrate includes a substrate, signal lines and test lines. The substrate includes a pixel region where pixels are disposed, a buffer region surrounding the pixel region and a grinding region surrounding the buffer region. The signal lines pass through the buffer region from the grinding region to provide the pixels with a driving signal. The test lines are disposed on the grinding region and the buffer region, respectively, so that the test lines intersect the signal lines in a lattice structure. Each of the test lines is electrically connected to the signal lines of a first number calculated by dividing a second number of the signal lines by a third number of the test lines. Thus, the performance of the pixels used for displaying an image may be tested more precisely.

19 Claims, 10 Drawing Sheets

FIRST DIRECTION

SECOND DIRECTION

FIRST DIRECTION
SECOND DIRECTION

METHOD OF MANUFACTURING A DISPLAY SUBSTRATE USING A LASER TO REMOVE TEST LINES FROM THE SUBSTRATE WITHOUT CUTTING THE SUBSTRATE

CROSS-REFERENCE TO RELATED APPLICATIONS

This application relies for priority upon Korean Patent Application No. 2004-71295 filed on Sep. 7, 2004, the contents of which are incorporated by reference herein in its entirety.

BACKGROUND

1. Field of the Invention 1.0 The present invention relates to a display substrate and a method of manufacturing the display substrate. More particularly, the present invention relates to a display substrate capable of detecting defective pixels displayed in an image and a method of manufacturing the display substrate.

2. Description of the Related Art

Generally, a display device is an interface device converting electrical data from a processing unit into a viewable image.

The display device includes a cathode ray tube (CRT) type display device, a liquid crystal display (LCD) device, an organic electroluminescence display (OELD) device, a plasma display panel (PDP) device, etc.

The display device may include pixels having a size of a few to tens of µm and signal lines electrically connected to the pixels to provide the pixels with a driving signal in order to display an image. The pixels and the signal lines are formed on a transparent substrate such as a glass substrate. An edge grinding region is formed on the glass substrate, and an edge grinding process is performed on the edge grinding region. Thus, the glass substrate is prevented from being cracked at an edge portion thereof.

Each of the pixels formed on the display device has a very small size, so that the pixels or the signal lines of the display device are tested after the pixels and signal lines are formed. Thus, a test line electrically connected to the signal lines is disposed on the edge grinding region.

The test line is disposed on the edge grinding region, and the pixels and the signal lines are tested. Then, the test line is removed in the edge grinding process.

However, since the edge grinding region has a very narrow width, a number and a width of the test lines are restricted within the width of the edge grinding region. When the test line has a narrow width, an electrical resistance of the test line increases, so that testing the pixels and the signal lines using the test line is not reliable.

SUMMARY

In accordance with the present invention, a display substrate for preventing failure of testing pixels or signal lines formed thereon is provided.

A method of manufacturing the above-mentioned display substrate is also provided.

In one aspect of the present invention, a display substrate includes a substrate, signal lines, and test lines. The substrate includes a pixel region where pixels are disposed, a buffer region surrounding the pixel region, and a grinding region surrounding the buffer region. The signal lines pass from the grinding region through the buffer region to the pixel region to provide the pixels with a driving signal. The test lines are disposed on the grinding region and the buffer region so that the test lines intersect the signal lines. Each of the test lines is electrically connected to an assigned number of signal lines (that assigned number being referred to as the first number, $N_1$). The first number ($N_1$) is calculated by dividing the number of signal lines (second number, $N_2$) by the number of test lines (third number ($N_3$).

In another aspect of the present invention, a method of manufacturing a display substrate is provided as follows. Signal lines are formed on a substrate including a pixel region, a buffer region surrounding the pixel region, and a grinding region surrounding the buffer region. The signal lines pass from the grinding region through the buffer region to the pixel region. A driving signal is provided to pixels of the pixel region through the signal lines to display an image. Test lines intersecting the signal lines in a lattice structure on the grinding region and the buffer region are formed. The test lines provide each of the signal lines with a test signal. Each of the test lines is provided with the test signal. The test lines are removed from the substrate.

In accordance with the present invention, the test lines testing the pixels are formed on the grinding region and the buffer region of the substrate, and then all the test lines are removed after testing the pixels. Therefore, the pixels formed on the substrate may be tested more precisely.

BRIEF DESCRIPTION OF THE DRAWINGS

The above and other features and advantage points of the present invention will become more apparent by describing in detailed exemplary embodiments thereof with reference to the accompanying drawings, in which.

DESCRIPTION OF THE EMBODIMENTS

Figure 1:
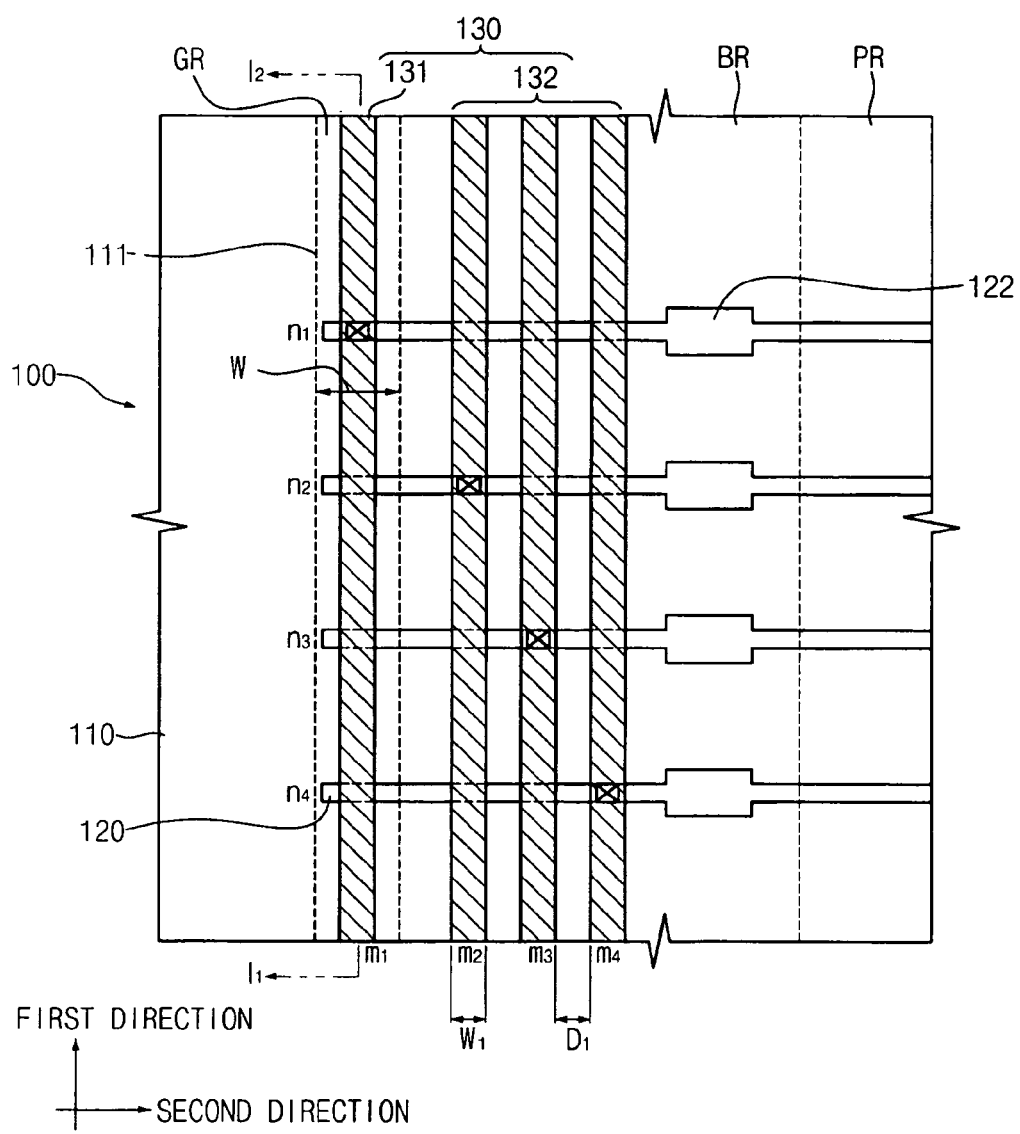
FIG. 1 is a plan view illustrating a portion of a display substrate in accordance with an exemplary embodiment.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like reference numerals refer to similar or identical elements throughout.

Figure 2:
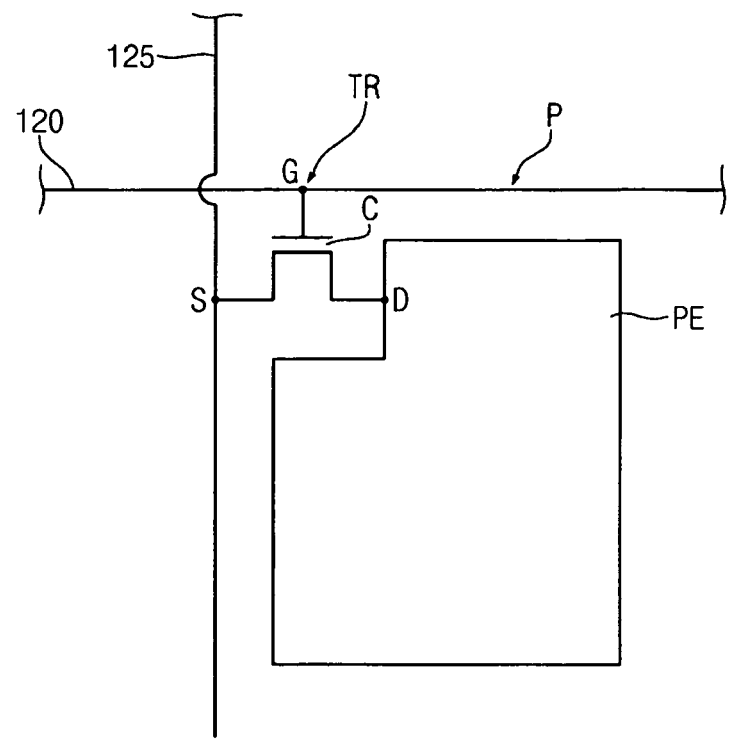
FIG. 2 is a plan view illustrating a pixel formed on a pixel region shown in FIG. 1.
Figure 3:
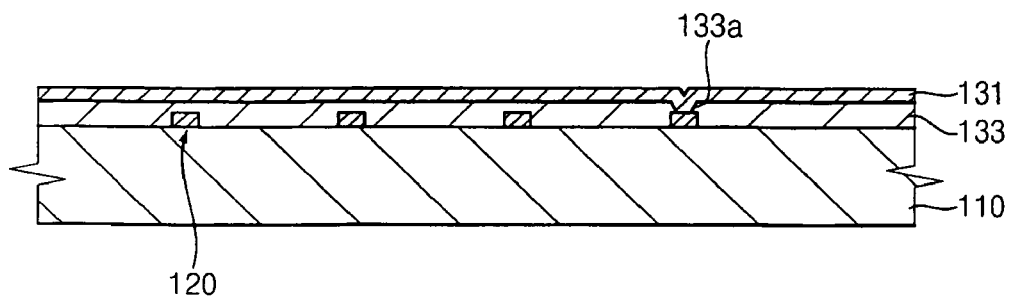
FIG. 3 is a cross sectional view taken along a line $I_1$-$I_2$ in FIG. 1.

FIG. 1 is a plan view illustrating a portion of a display substrate in accordance with an exemplary embodiment. FIG. 2 is a plan view illustrating a pixel formed on a pixel region shown in FIG. 1. FIG. 3 is a cross sectional view taken along a line $I_1$-$I_2$ in FIG. 1.

Referring to FIGS. 1 and 2, a display substrate 100 includes a substrate 110, a first set of signal lines 120 and a first set of test lines 130.

The substrate 110 includes a pixel region PR, a buffer region BR and a grinding region GR.

The pixel region PR of the substrate 110 is disposed on a central portion of the substrate 110. The pixel region PR on the substrate 110 has a rectangular shape when viewed in a plan view perspective.

Pixels shown in FIG. 2 are disposed on the pixel region PR in a matrix shape. In the present embodiment, when the display substrate 100 has a resolution of 1024×768, the number of pixels 'P' provided in the pixel region PR is 1024×768×3=2,359,296.

Each of the pixels 'P' includes a thin film transistor TR and a pixel electrode PE. The thin film transistor TR includes a gate electrode portion 'G', a source electrode portion 'S', a channel layer 'C', and a drain electrode portion 'D'.

The pixel electrode PE is electrically connected to the drain electrode portion 'D' of the thin film transistor TR, and includes a transparent and conductive material, for example, such as indium tin oxide (ITO), indium zinc oxide (IZO), or amorphous indium tin oxide (a-ITO).

The buffer region BR surrounds the pixel region PR, and the grinding region GR surrounds the buffer region BR.

An organic layer is disposed on the pixel region PR where the pixels 'P' are formed. The organic layer protects the pixels 'P'. In the present embodiment, the organic layer is selectively formed on the pixel region PR. Alternatively, the organic layer may also be formed on a portion of the buffer and grinding regions BR and GR. However, the organic layer is preferably not formed on a portion corresponding to the first set of test lines 130 formed on the buffer and grinding regions BR and GR. Thus, the organic layer is prevented from being deteriorated when the first set of test lines 130 are removed using a laser beam, as will be described in greater detail below. The first set of test lines 130 will be described in detail afterward.

The grinding region GR has a width of W from an edge line 111 of the substrate 110. In the present embodiment, the width of the grinding region GR is about 225 μm.

A driving voltage for displaying an image is applied to the pixel electrode PE of each pixel 'P' through each signal line in the first set of signal lines 120. The driving voltage may be a timing signal or a data signal.

The timing signal is applied to the gate electrode portion 'G' of the thin film transistor TR, so that the channel layer 'C' changes from a non-conductive layer to a conductive layer or from a conductive layer to a nonconductive layer.

The data signal is applied to the source electrode portion 'S' of the thin film transistor TR, and then the data signal is applied to the pixel electrode PE in accordance with the timing signal.

In the present embodiment, the first set of signal lines 120 shown in FIG. 1 correspond to gate signal lines applying the timing signal to the pixel 'P'.

The first set of signal lines 120 extend in a second direction shown in FIG. 1, and are disposed substantially parallel with each other in a first direction shown in FIG. 1. The first and second directions are substantially perpendicular to each other. The first set of signal lines 120 extend from the grinding region GR to the pixel region PR via the buffer region BR.

Each signal line in the first set of signal lines 120 includes a pad 122 formed on the buffer region BR. For example, a tape carrier package (TCP) is electrically connected to the pad 122 via an anisotropic conductive film (ACF).

The first set of test lines 130 are disposed on the substrate 110 where the first set of signal lines 120 are formed. The first set of test lines 130, for example, extend in the first direction to intersect with the first set of signal lines 120. At least two test lines in the first set of test lines 130 are disposed substantially in parallel with each other in the second direction. The first set of test lines 130 are disposed substantially perpendicular to the first set of signal lines 120. Thus, the first set of test lines 130 intersect the first set of signal lines 120 in a lattice structure.

In the present embodiment, the number of test lines in the first set of test lines 130 is a first number, $N_1$. The number of signal lines in the first set of signal lines 120 is a second number, $N_2$. The first number ($N_1$) of test lines is related to the second number ($N_2$) of signal lines. For example, the first number ($N_1$) of test lines in the first set of test lines 130 may be in the range of about 2 to 6. Alternatively, the first number ($N_1$) of test lines in the first set of test lines 130 may be greater than 6, depending on the second number ($N_2$) of signal lines in the first set of signal lines 120. For example, the first number ($N_1$) of test lines in the first set of test lines 130 is about 4 when the second number ($N_2$) of the first set of signal lines 120 is about 768.

The first set of test lines 130 include a first test line subset 131 disposed on the grinding region GR and a second test line subset 132 disposed on the buffer region BR. The first and second test line subsets 131 and 132 comprise at least one test line each. In the present embodiment, the first test line subset 131 includes one test line, and the second test line subset 132 includes three to five test lines. Intervals D1 between the first set of test lines 130 are substantially same. For example, each of the intervals D1 between the test lines in the first set of test lines 130 is about 12 μm to about 60 μm.

A width W1 of each of the first set of test lines 130 is in a range of about 25 μm to about 60 μm such that a contact resistance between each of the first set of test lines 130 and the substrate 110 may be reduced. In the present embodiment, the width W1 of each test line in the first set of test lines 130 is about 60 μm.

A test signal is applied to the first set of signal lines 120 via the first set of test lines 130 in order to test the performance of the pixels 'P' on the pixel region PR.

In the present embodiment, each of the first set of test lines 130 is electrically connected to a third number ($N_3$) of signal lines in the first set of signal lines 120, wherein the third number ($N_3$) is calculated by dividing the second number ($N_2$) of signal lines in the first set of signal lines 120 by the first number ($N_1$) of test lines in the first set of test lines 130. For example, when the second number ($N_2$) of signal lines in the first set of signal lines 120 is about 768 and the first number ($N_1$) of test lines in the first set of test lines 130 is 4, each of the first set of test lines 130 is electrically connected to about $N_3$=768/4=192 signal lines from the first set of signal lines 120.

As described above, when each test line in the first set of test lines 130 is electrically connected to an assigned number of signal lines from the first set of signal lines 120, the test signal applied to each of the first set of signal lines 120 from the first set of test lines 130 experience a reduced electric resistance in comparison with the case where all of the signal lines are electrically connected to one test line. In addition, generally, the more test lines there are, the effect of capacitance on each of the test lines is reduced. Thus, the test signal is prevented from being distorted and the performance of the pixels 'P' may be tested more precisely.

Hereinafter, the connection between the first set of test lines 130 and the first set of signal lines 120 will be described in detail.

In accordance with one embodiment, the connection between the four lines in the first set of signal lines 120 and the four lines in the first set of test lines 130 will be described.

The four test lines in the first set of test lines 130 are numbered as m1, m2, m3, and m4 in FIG. 1, respectively. The four signal lines in the first set of signal lines 120 are numbered as n1, n2, n3, and n4 in FIG. 1, respectively. The first number ($N_1$) of the first set of test lines 130 is four, and the second number ($N_2$) of the first set of signal lines 120 is also four. Thus, each of the test lines in the first set of test lines 130 is connected to one of the first set of signal lines 120.

A signal line n1, for example, is electrically connected to a test line m1, and is electrically insulated from remaining test lines m2, m3 and m4. A signal line n2, for example, is electrically connected to a test line m2, and is electrically insulated from remaining test lines m1, m3 and m4. A signal line n3, for example, is electrically connected to a test line m3, and is electrically insulated from remaining test lines m1, m2 and m4. A signal line n4, for example, is electrically connected to a test line m4, and is electrically insulated from remaining test lines m1, m2 and m3.

Although not shown in FIG. 1, the signal lines adjacent to the signal line n4 are electrically connected to the signal lines m1 to m4 successively as described above.

The first set of signal lines 120 and the first set of test lines 130 are insulated from each other by an insulation layer 133, and are electrically connected to each other via a contact hole 133a.

Figure 4:
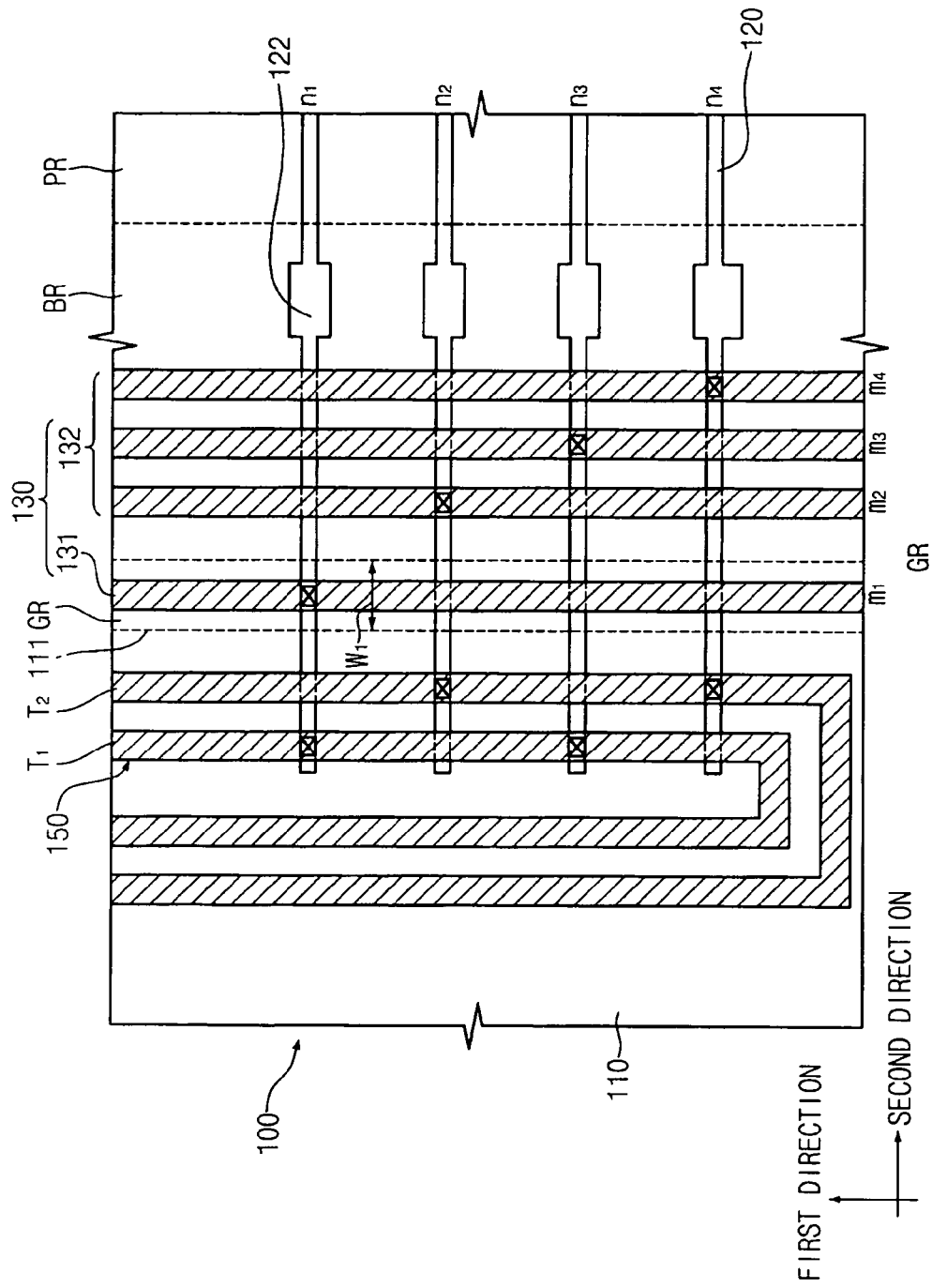
FIG. 4 is a plan view illustrating a display substrate including static electricity removal lines formed on the display substrate shown in FIG. 1.

FIG. 4 is a plan view illustrating a display substrate including static electricity removal lines formed on the display substrate shown in FIG. 1.

Referring to FIG. 4, the display substrate 100 further includes one or more static electricity removal lines 150. The static electricity removal line 150 is disposed outside the grinding region GR of the substrate 110 to remove static electricity, thereby preventing the static electricity of a high voltage generated from the substrate 110 from being applied to the pixels 'P' via the first set of signal lines 120.

The display substrate 100 includes, for example, two static electricity removal lines 150. A first static electricity removal line T1 is electrically connected to odd numbered signal lines, and a second static electricity removal line T2 is electrically connected to even numbered signal lines. Each of these static electricity removal lines 150 may have a lower electric resistance than that of the pad 122, so that the static electricity may be effectively removed through the static electricity removal lines 150. For example, the static electricity removal lines 150 are connected to a ground.

Figure 5:
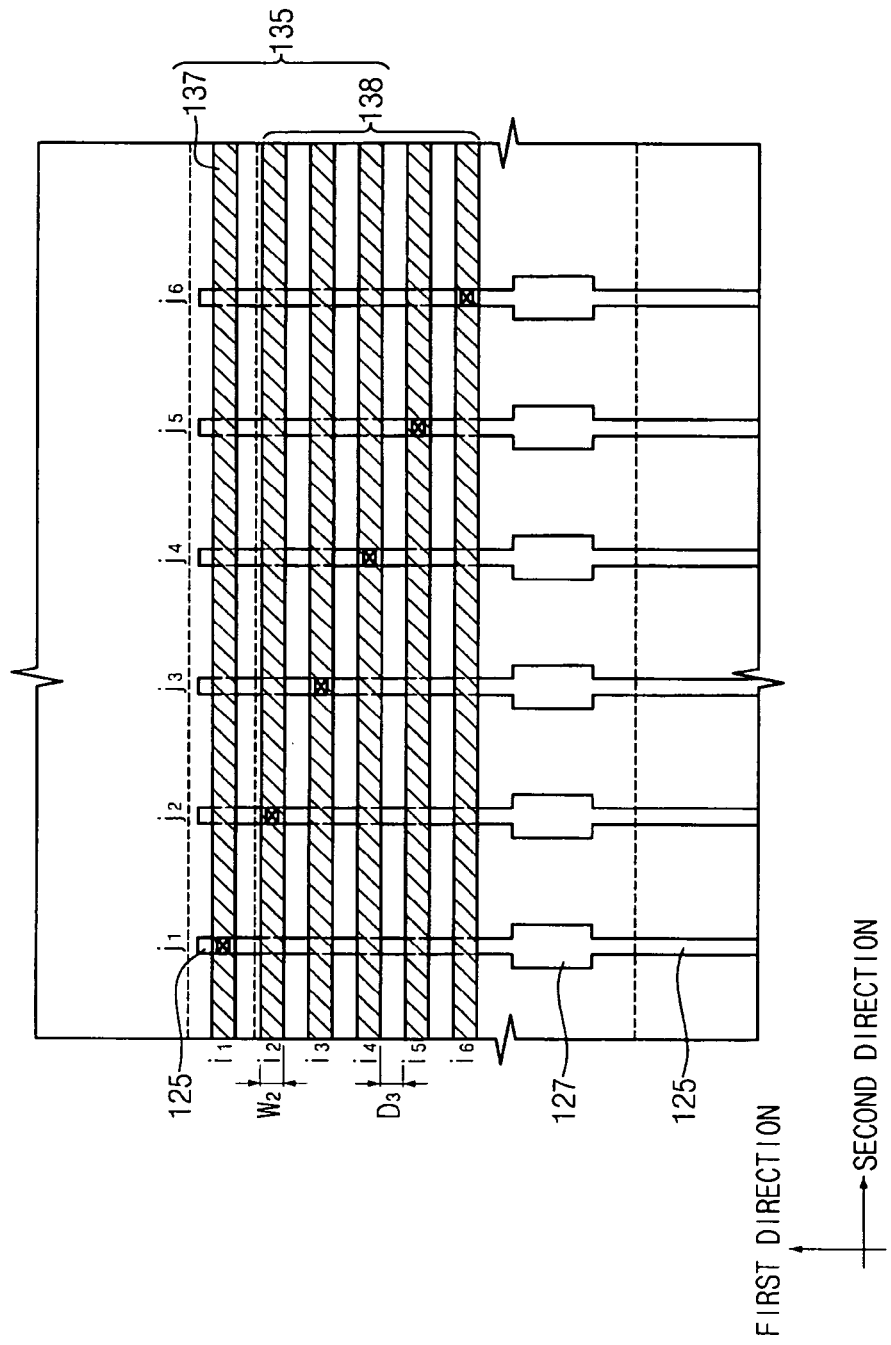
FIG. 5 is a plan view illustrating a portion of a display substrate in accordance with another exemplary embodiment.

FIG. 5 is a plan view illustrating a portion of a display substrate in accordance with another exemplary embodiment. The display substrate in accordance with the present embodiment is substantially identical to the display substrate in FIG. 1, but with a different configuration of test lines and signal lines. Thus, the description for the substantially similar elements will be omitted.

Referring to FIGS. 2 and 5, a driving voltage for displaying an image is applied to the pixel electrode PE of each pixel 'P' through each signal line in the second set of signal lines 125. The driving voltage may be a data signal.

The data signal is applied to the source electrode portion 'S' of the thin film transistor TR, and then the data signal is applied to the pixel electrode PE in accordance with the timing signal.

In the present embodiment, the second set of signal lines 125 shown in FIG. 5 correspond to data signal lines applying the data signal to the pixel 'P'.

The second set of signal lines 125 extend in a first direction shown in FIG. 5, and are disposed substantially parallel with each other in a second direction shown in FIG. 5. The first and second directions are substantially perpendicular to each other. The second set of signal lines 125 extend from the grinding region GR to the pixel region PR via the buffer region BR.

Each signal line in the second set of signal lines 125 includes a pad 127 formed on the buffer region BR. For example, a TCP is electrically connected to the pad 122 via an ACF.

The second set of test lines 135 are disposed on the substrate 110 where the second set of signal lines 125 are formed. The second set of test lines 135, for example, extend in the second direction to intersect with the second set of signal lines 125. At least two test lines from the second set of test lines 135 are disposed substantially in parallel with each other in the first direction. The second set of test lines 135 are disposed substantially perpendicular to the second set of signal lines 125. Thus, the second set of test lines 135 intersect the second set of signal lines 125 in a lattice structure.

In the present embodiment, the number of test lines in the second set of test lines 135 (referred to as the fourth number ($N_4$)) corresponds to the number of signal lines in the second signal lines 125 (referred to as the fifth number, $N_5$). For example, the fourth number ($N_4$) of the second set of test lines 135 is in the range of about 2 to about 6. Alternatively, the fourth number ($N_4$) of the second set of test lines 135 may be greater than about 6, depending on the fifth number ($N_5$) of the second set of signal lines 125. For example, the fourth number ($N_4$) of the second set of test lines 135 is about 6 when the fifth number ($N_5$) of the second set of signal lines 125 is about 1024×3.

The second set of test lines 135 include a first test line subset 137 disposed on the grinding region GR and a second test line subset 138 disposed on the buffer region BR. The first and second test line subsets 137 and 138 comprise at least one test line each. In the present embodiment, the first test line subset 137 includes one test line, and the second test line subset 138 includes five test lines. Intervals D3 between each of the second set of test lines 135 are substantially the same. For example, each of the intervals D3 between each of the second set of test lines 135 is about 12 μm to about 60 μm.

A width W2 of each test line in the second set of test lines 135 is in a range of about 25 μm to about 60 μm such that a contact resistance between each of the second set of test lines 135 and the substrate 110 may be reduced. In the present embodiment, the width W2 of each test line in the second set of test lines 135 is about 35 μm.

A test signal is applied to the second set of signal lines 125 via the second set of test lines 135, in order to test the performance of the pixels 'P' on the pixel region PR.

In the present embodiment, each of the second set of test lines 135 is electrically connected to a sixth number ($N_6$) of signal lines in the second set of signal lines 125, wherein the sixth number ($N_6$) is calculated by dividing the fifth number ($N_5$) of the second set of signal lines 125 by the fourth number ($N_4$) of the second set of test lines 135. For example, when the fifth number ($N_5$) of the second set of signal lines 125 is about 1024×3=3072, and the fourth number ($N_4$) of the second set of test lines 135 is 6, each of the second set of test lines 135 is electrically connected to about 3072/6=512 signal lines in the second set of signal lines 125.

As described above, each of the second set of test lines 135 is electrically connected to an assigned number of signal lines in the second set of signal lines 125, so that the test signal applied to each of the second set of signal lines 125 from the second set of test lines 135 is prevented from being distorted, and thus the performance of the pixels 'P' may be tested more precisely.

Hereinafter, the connection between the second set of test lines 135 and the second set of signal lines 125 will be described in detail.

In accordance with one embodiment, the connection between the six signal lines in the second set of signal lines 125 and the six test lines in the second set of test lines 135 will be described.

The six test lines in the second set of test lines 135 are numbered as i1, i2, i3, i4, i5 and i6 in FIG. 5, respectively. The six signal lines in the second set of signal lines 125 are numbered as j1, j2, j3, j4, j5 and j6 in FIG. 5, respectively. Thus, the fourth number ($N_4$) of the second set of test lines 135 is six, and the fifth number ($N_5$) of the second set of signal lines 125 is six. Thus, each test line in the second set of test lines 135 is connected to each signal line in the second set of signal lines 125.

A signal line j1, for example, is electrically connected to a test line i1, and is electrically insulated from remaining test lines i2, i3, i4, i5 and i6. A signal line j2, for example, is electrically connected to a test line i2, and is electrically insulated from remaining test lines i1, i3, i4, i5 and i6. A signal line j3, for example, is electrically connected to a test line i3, and is electrically insulated from remaining test lines i1, i2, i4, i5 and i6. A signal line j4, for example, is electrically connected to a test line i4, and is electrically insulated from remaining test lines i1, i2, i3, i5 and i6. A signal line j5, for example, is electrically connected to a test line i5, and is electrically insulated from remaining test lines i1, i2, i3, i4 and i6. A signal line j6, for example, is electrically connected to a test line i6, and is electrically insulated from remaining test lines i1, i2, i3, i4 and i5.

Although not shown in FIG. 5, the signal lines adjacent to the signal line j6 are electrically connected to the signal lines i1 to i6 successively as described above.

The second set of signal lines 125 and the second set of test lines 135 are insulated from each other by an insulation layer (not shown), and are electrically connected to each other via a contact hole (not shown).

Figure 6:
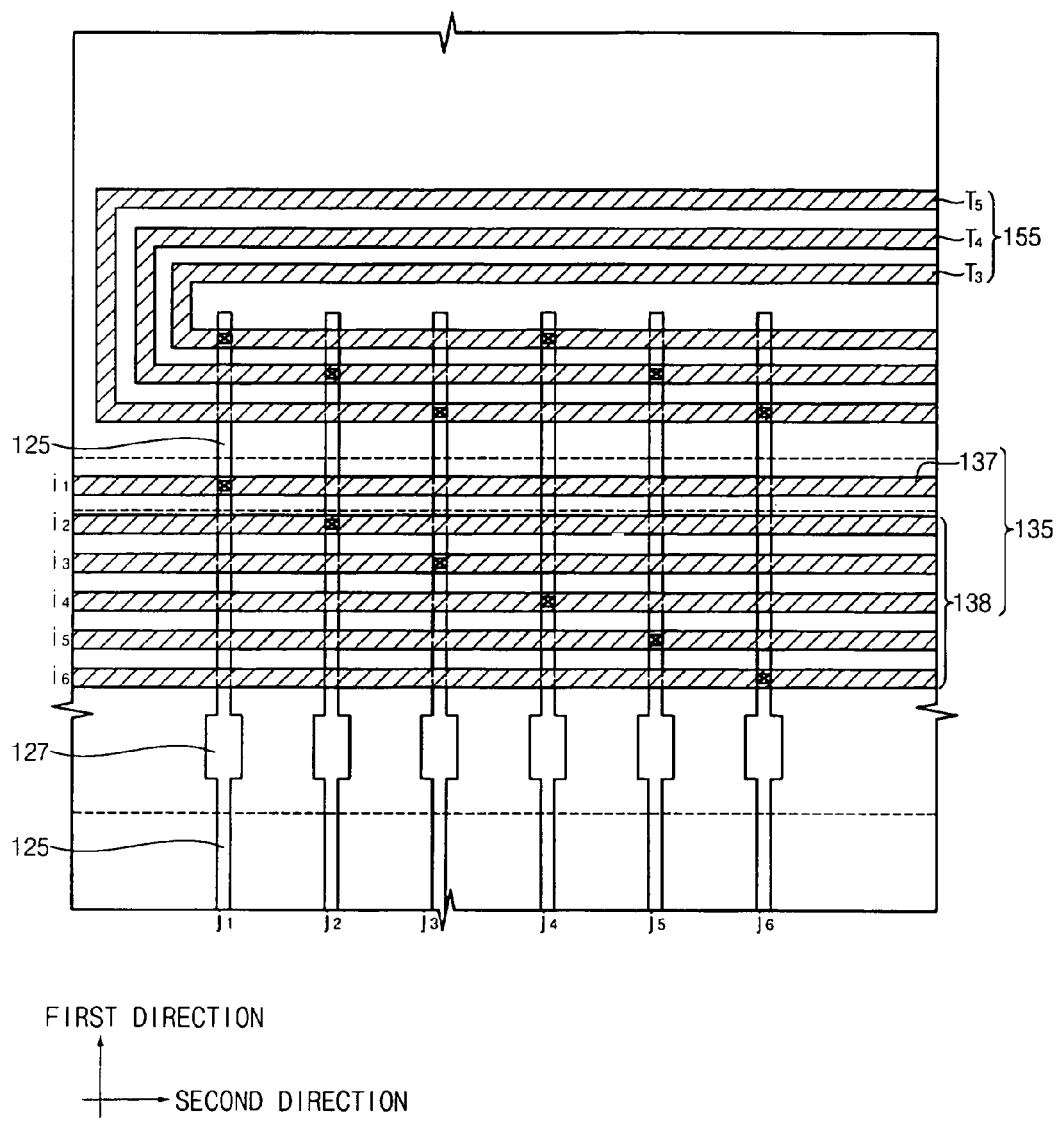
FIG. 6 is a plan view illustrating a display substrate including static electricity removal lines formed on the display substrate shown in FIG. 5.

FIG. 6 is a plan view illustrating a display substrate including static electricity removal lines formed on the display substrate shown in FIG. 5.

Referring to FIG. 6, the display substrate 100 further includes one or more static electricity removal lines 155. The static electricity removal lines 155 are disposed outside the grinding region GR of the substrate 110 to remove static electricity, thereby preventing the static electricity of a high voltage generated from the substrate 110 from being applied to the pixels 'P' via the second set of signal lines 125.

The display substrate 100 includes, for example, three static electricity removal lines 155. When k is defined as an integer not less than zero, a third static electricity removal line T3 is electrically connected to 3 k+1 numbered signal lines, a fourth static electricity removal line T4 is electrically connected to 3 k+2 numbered signal lines, and a fifth static electricity removal line T5 is electrically connected to 3 k+3 numbered signal lines.

Figure 7:
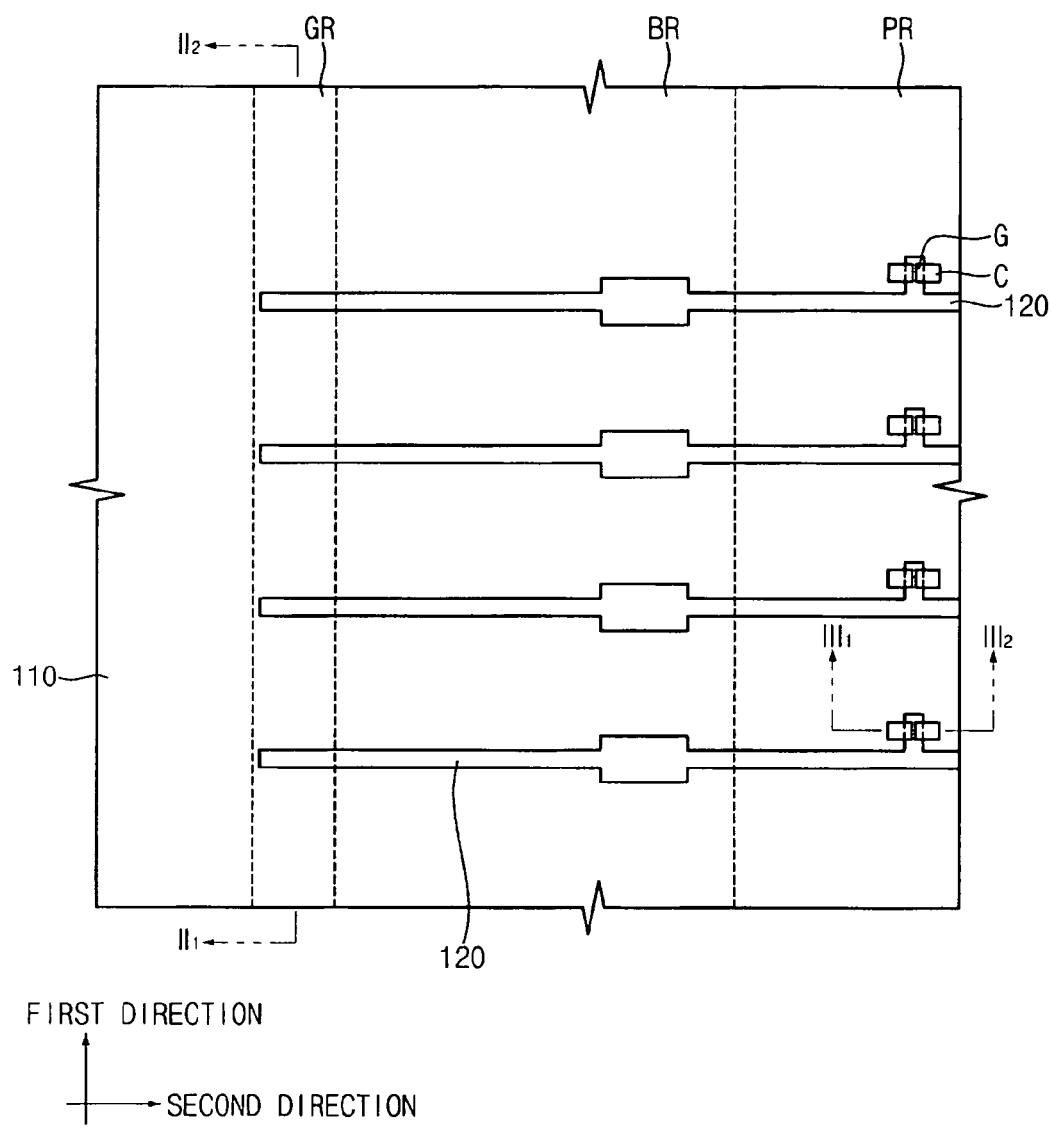
FIG. 7 is a plan view illustrating a portion of a display substrate including signal lines formed thereon in accordance with still another exemplary embodiment.
Figure 8:
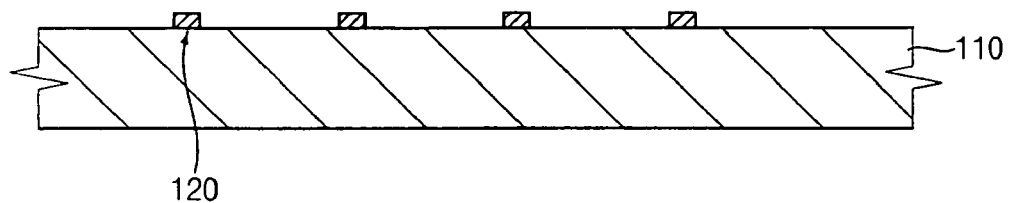
FIG. 8 is a cross sectional view taken along a line $II_1$-$II_2$ in FIG. 7.
Figure 9:
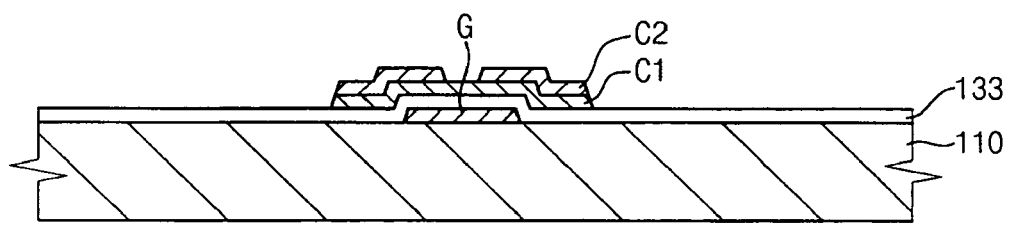
FIG. 9 is a cross sectional view taken along a line $III_1$-$III_2$ in FIG. 7.

FIG. 7 is a plan view illustrating a portion of a display substrate including signal lines formed thereon in accordance with still another exemplary embodiment. FIG. 8 is a cross sectional view taken along a line $II_1$-$II_2$ in FIG. 7. FIG. 9 is a cross sectional view taken along a line $III_1$-$III_2$ in FIG. 7.

Referring to FIGS. 7 and 8, the grinding region GR, the buffer region BR, and the pixel region PR are formed on the substrate 110. The first set of signal lines 120 are formed on the substrate 110 in a second direction shown in FIG. 7. In the present embodiment, the first set of signal lines 120 are gate lines providing a timing signal.

The first set of signal lines 120 are formed on the substrate 110 by patterning a gate thin film comprising aluminum (Al) or aluminum alloy through a photolithography process. The first set of signal lines 120 extend in the second direction. For example, the 768 first signal lines 120 are disposed substantially in parallel with each other in a first direction shown in FIG. 7 that is substantially perpendicular to the second direction. About 1024×3 gate electrode portions 'G' in each of the first set of signal lines 120 protrude in the first direction.

Referring to FIG. 9, the insulation layer 133 is formed over the entire surface of the substrate 110. This enables the substrate 110 to be covered with the first set of signal lines 120. The channel layer 'C' is formed on the entire surface of the insulation layer 133. An amorphous silicon film C1 and two n+amorphous silicon films C2 are successively formed on the channel layer 'C'. The amorphous silicon film C1 and the n+amorphous silicon films C2 are patterned through a photolithography process. Thus, the amorphous silicon film C1 and the n+amorphous silicon films C2 are formed over the gate electrode portion 'G'. The two n+ amorphous silicon films C2 are spaced apart from each other on the amorphous silicon film C1.

Figure 10:
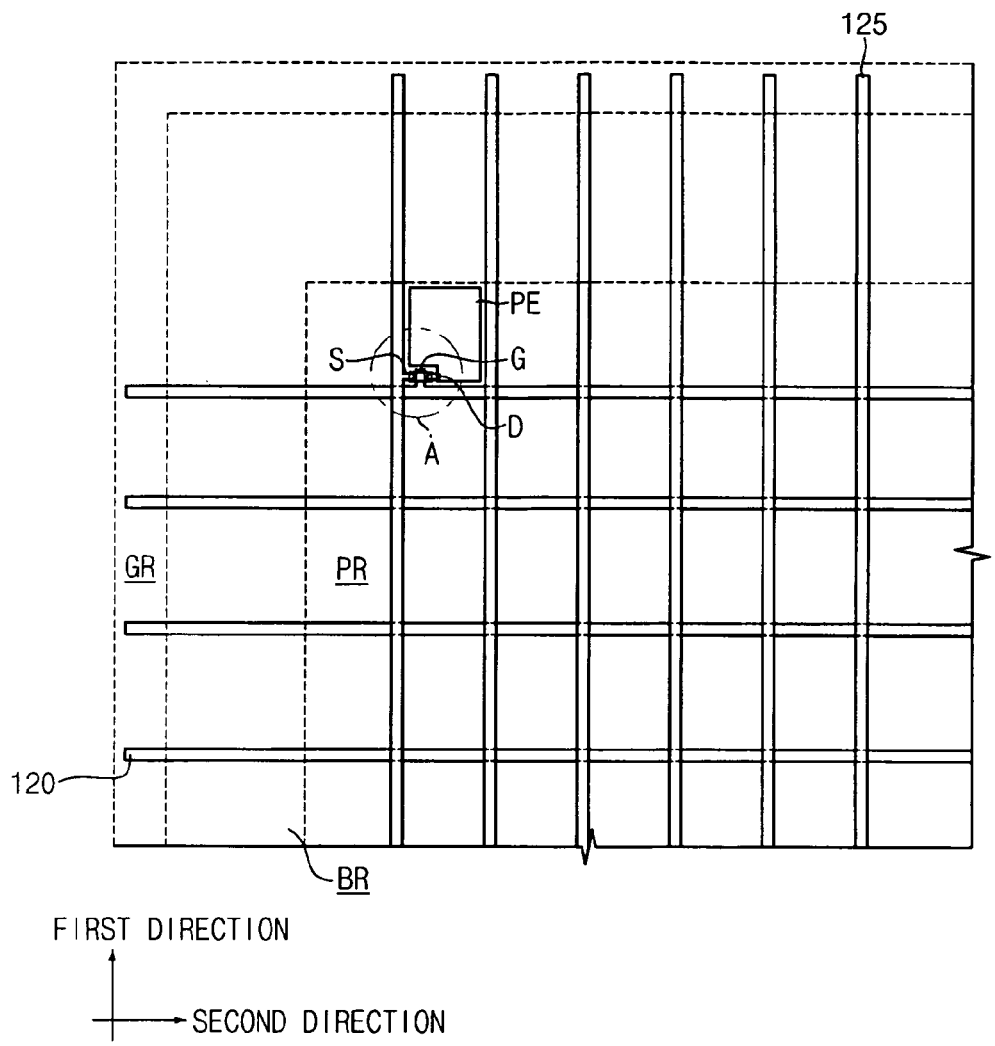
FIG. 10 is a plan view illustrating a display substrate including another signal lines formed on the display substrate shown in FIG. 7.
Figure 11:
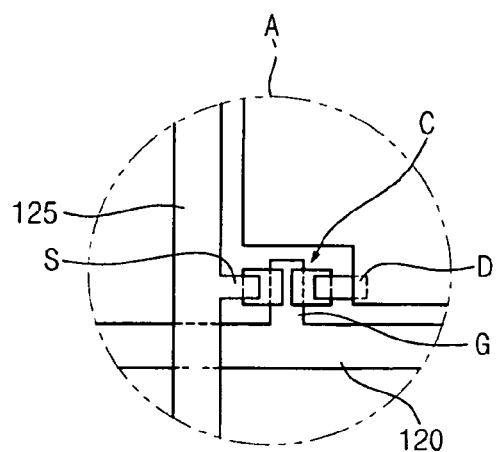
FIG. 11 is a partially enlarged view of a portion 'A' in FIG. 10.

FIG. 10 is a plan view illustrating a display substrate including signal lines formed on the display substrate shown in FIG. 7. FIG. 11 is a partially enlarged view of the portion 'A' indicated in FIG. 10.

Referring to FIGS. 10 and 11, after the first set of signal lines 120 and the channel layer 'C' are successively formed on the substrate 110, the second set of signal lines 125 are formed thereon. The second set of signal lines 125 extend in the second direction. In the present embodiment, the second set of signal lines 125 are data lines providing a data signal.

The second set of signal lines 125 are formed on the substrate 110 by patterning a source/drain thin film comprising aluminum (Al) or aluminum alloy through a photolithography process. The drain electrode portions 'D' are formed simultaneously through the photolithography process. The second set of signal lines 125 extend in the first direction. For example, the second set of signal lines 125 includes about 1024×3=3072 signal lines disposed substantially parallel with each other in the second direction. About 768 source electrode portions 'S' in the each of the second set of signal lines 125 protrud in the second direction.

The source electrode portion 'S' is electrically connected to one of the n+ amorphous silicon films C2 of the channel layer 'C'. The drain electrode portion 'D' is electrically connected to the other of the n+amorphous silicon films C2 of the channel layer 'C'.

The pixel electrode PE including a transparent and conductive material is formed on each of regions defined by the first set of signal lines 120 and the second set of signal lines 125 disposed in a lattice structure. The pixel electrode PE includes ITO, IZO, a-ITO, etc.

After the pixel electrode PE is formed, the insulation layer is formed on the entire surface of the substrate 110.

Figure 12:
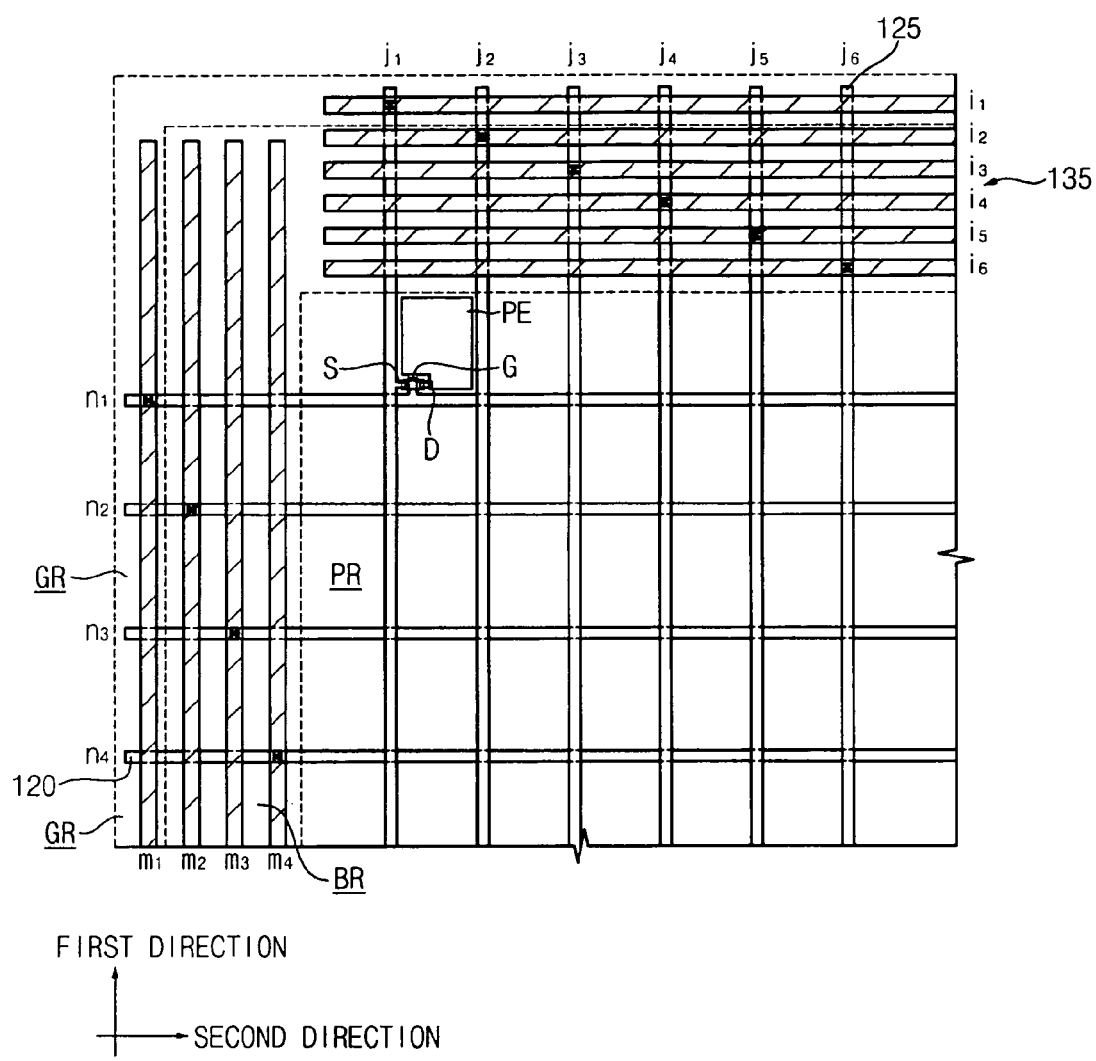
FIG. 12 is a plan view illustrating a display substrate including test lines formed on a grinding region and a buffer region of the display substrate shown in FIG. 7.

FIG. 12 is a plan view illustrating a display substrate including test lines formed on a grinding region and a buffer region of the display substrate shown in FIG. 7.

Referring to FIG. 12, a metallic thin film is formed on the entire surface of the substrate 110. The metallic thin film comprising aluminum or aluminum alloy is patterned through a photolithography process, so that the first and second sets of test lines 130 and 135 are formed on the grinding region GR and the buffer region BR.

A first test signal is transmitted to the first set of signal lines 120 via the first set of test lines 130.

The first set of test lines 130 extend in the first direction on the substrate 110 to intersect the first set of signal lines 120. At least two test lines in the first set of test lines 130 are formed substantially in parallel with each other in the second direction. The first set of test lines 130 are formed substantially perpendicular to the first set of signal lines 120. Thus, the first set of test lines 130 intersect the first set of signal lines 120 in a lattice structure.

In the present embodiment, the number of test lines in the first set of test lines 130 (first number, $N_1$) corresponds to the number of signal lines in the first set of signal lines 120 (second number, $N_2$). For example, the first number ($N_1$) of the first set of test lines 130 is in the range of about 2 to about 6. Alternatively, the first number ($N_1$) of the first set of test lines 130 may be greater than 6, depending on the second number ($N_2$) of the first set of signal lines 120. For example, the first number ($N_1$) of the first set of test lines 130 is about 4 when the second number ($N_2$) of the first set of signal lines 120 is about 768.

The first set of test lines 130 are formed on the grinding region GR and the buffer region BR. In the present embodiment, one test line in the first set of test lines 130 is formed on the grinding region GR and the other test lines in the first set of test lines 130 are formed on the buffer region BR. For example, each of intervals between the test lines in the first set of test lines 130 is about 20 μm.

A width of each test line in the first set of test lines 130 is in the range of about 25 μm to about 60 μm such that a contact resistance between the first set of test lines 130 and the substrate 110 may be reduced. In the present embodiment, the width of each test line in the first set of test lines 130 is about 60 μm.

The first test signal is transmitted to the first set of signal lines 120 via the first set of test lines 130.

In the present embodiment, each of the first set of test lines 130 is electrically connected to an assigned number of signal lines in the first set of signal lines 120, wherein the assigned number signal lines (third number, $N_3$) is calculated by dividing the second number ($N_2$) of the first set of signal lines 120 by the first number ($N_1$) of the first set of test lines 130. For example, when the second number ($N_2$) of the first set of signal lines 120 is about 768, and the first number ($N_1$) of the first set of test lines 130 is 4, each test line in the first set of test lines 130 is electrically connected to about ($N_3$=768/4=192 signal lines from the first set of signal lines 120.

As described above, each test line in the first set of test lines 130 is electrically connected to an assigned number of signal lines from the first set of signal lines 120, so that the first test signal applied to each signal line in the first set of signal lines 120 from the first set of test lines 130 is prevented from being distorted, and thus the performance of the pixels 'P' may be tested more precisely.

Hereinafter, connection between the first set of test lines 130 and the first set of signal lines 120 will be described in detail.

In accordance with one embodiment, the connection between the four lines from the first set of signal lines 120 and the four lines from the first set of test lines 130 will be described.

The four lines from the first set of test lines 130 are numbered as m1, m2, m3 and m4 in FIG. 12, respectively. The four lines from the first set of signal lines 120 are numbered as n1, n2, n3 and n4 in FIG. 12, respectively. The first number ($N_1$) of the first set of test lines 130 is four, and the second number ($N_2$) of the first set of signal lines 120 is four. Thus, each of the test lines in the first set of test lines 130 is connected to one of the signal lines in the first set of signal lines 120.

A signal line n1, for example, is electrically connected to a test line m1, and is electrically insulated from remaining test lines m2, m3 and m4. A signal line n2, for example, is electrically connected to a test line m2, and is electrically insulated from remaining test lines m1, m3 and m4. A signal line n3, for example, is electrically connected to a test line m3, and is electrically insulated from remaining test lines m1, m2 and m4. A signal line n4, for example, is electrically connected to a test line m4, and is electrically insulated from remaining test lines m1, m2 and m3.

Although not shown in FIG. 12, the signal lines adjacent to the signal line n4 are electrically connected to the signal lines m1 to m4 successively as described above.

The first set of signal lines 120 and the first set of test lines 130 are insulated from each other by an insulation layer (not shown), and are electrically connected to each other via a contact hole (not shown).

Referring again to FIG. 12, a second test signal is transmitted to the second set of signal lines 125 via the second set of test lines 135.

The second set of test lines 135 are formed on the substrate 110 where the second set of signal lines 125 are formed. The second set of test lines 135 extend in the second direction on the substrate 110 to intersect the second set of signal lines 125. At least two test lines in the second set of test lines 135 are formed substantially in parallel with each other in the first direction. The second set of test lines 135 are formed substantially perpendicular to the second set of signal lines 125. Thus, the second set of test lines 135 intersect the second set of signal lines 125 in a lattice structure.

In the present embodiment, the number of test lines in the second set of test lines 135 is a fourth number, $N_4$. The number of signal lines in the second set of signal lines 125 is a fifth number, $N_5$. For example, the fourth number ($N_4$) of the second set of test lines 135 is in the range of about 2 to about 6. Alternatively, the fourth number ($N_4$) of the second set of test lines 135 may be greater than 6, depending on the fifth number ($N_5$) of the second set of signal lines 125. For example, the fourth number ($N_4$) of the second set of test lines 135 is about 6 when the fifth number ($N_5$) of the second set of signal lines 125 is about 1024×3.

The second set of test lines 135 are formed on the grinding region GR and the buffer region BR. In the present embodiment, the fifth number ($N_5$) of the second set of test lines 135 is six. Intervals between the test lines in the second set of test lines 135 are substantially the same. For example, each of the intervals between the second test lines 135 is about 20 μm.

A width of each test line in the second set of test lines 135 is in a range of about 25 μm to about 60 μm such that a contact resistance between each of the second set of test lines 135 and the substrate 110 may be reduced. In the present embodiment, the width of each test line in the second set of test lines 135 is about second test signal is transmitted to the second set of signal lines 125 via the second set of test lines 135, in order to test the performance of the pixels 'P' on the pixel region PR.

In the present embodiment, each of the second set of test lines 135 is electrically connected to a sixth number ($N_6$) of signal lines in the second set of signal lines 125. The sixth number ($N_6$) is calculated by dividing the fifth number ($N_5$) of the second set of signal lines 125 by the fourth number ($N_4$) of the second set of test lines 135. For example, when the fifth number ($N_5$) of the second set of signal lines 125 is about 1024×3=3072, and the fourth number ($N_4$) of the second set of test lines 135 is 6, each of the test lines in the second set of test lines 135 is electrically connected to about 3072/6=512 signal lines in the second set of signal lines 125.

As described above, each of the second set of test lines 135 is electrically connected to an assigned number of signal lines from the second set of signal lines 125, so that the first test signal applied to each signal line in the second set of signal lines 125 from the second set of test lines 135 is prevented from being distorted, and thus the performance of the pixels 'P' may be tested more precisely.

Hereinafter, connection between the second set of test lines 135 and the second set of signal lines 125 will be described in detail.

In accordance with one embodiment, the connection between the six signal lines in the second set of signal lines 125 and the six test lines in the second set of test lines 135 will be described.

The six test lines in the second set of test lines 135 are numbered as i1, i2, i3, i4, i5 and i6 in FIG. 12, respectively. The six signal lines in the second set of signal lines 125 are numbered as j1, j2, j3, j4, j5 and j6 in FIG. 12, respectively. The fourth number ($N_4$) of the second set of test lines 135 is six, and the fifth number ($N_5$) of the second set of signal lines 125 is six. Thus, each test line in the second set of test lines 135 is connected to one signal line in the second set of signal lines 125.

A signal line j1, for example, is electrically connected to a test line i1, and is electrically insulated from remaining test lines i2, i3, i4, i5 and i6. A signal line j2, for example, is electrically connected to a test line i2, and is electrically insulated from remaining test lines i1, i3, i4, i5 and i6. A signal line j3, for example, is electrically connected to a test line i3, and is electrically insulated from remaining test lines i1, i2, i4, i5 and i6. A signal line j4, for example, is electrically connected to a test line i4, and is electrically insulated from remaining test lines i1, i2, i3, i5 and i6. A signal line j5, for example, is electrically connected to a test line i5, and is electrically insulated from remaining test lines i1, i2, i3, i4 and i6. A signal line j6, for example, is electrically connected to a test line i6, and is electrically insulated from remaining test lines i1, i2, i3, i4 and i5.

Although not shown in FIG. 12, the signal lines adjacent to the signal line j6 are electrically connected to the signal lines i1 to i6 successively as described above.

The second set of signal lines 125 and the second set of test lines 135 are insulated from each other by an insulation layer (not shown), and are electrically connected to each other via a contact hole (not shown).

After the first set of test lines 130 and the second set of test lines 135 are formed on the substrate 110, the pixels 'P' formed on the substrate 110 are tested. The second test signal is applied to the second set of test lines 135 in order to test the pixels 'P'.

Then, the first test signal is applied to the first set of test lines 130, so that the channel layer 'C' changes from a non-conductive layer to a conductive layer. Thus, the second test signal transmitted to the second set of signal lines 125 is applied to the pixel electrode PE via the channel layer 'C' and the drain electrode portion 'D'. Accordingly, the display substrate may be tested.

Figure 13:
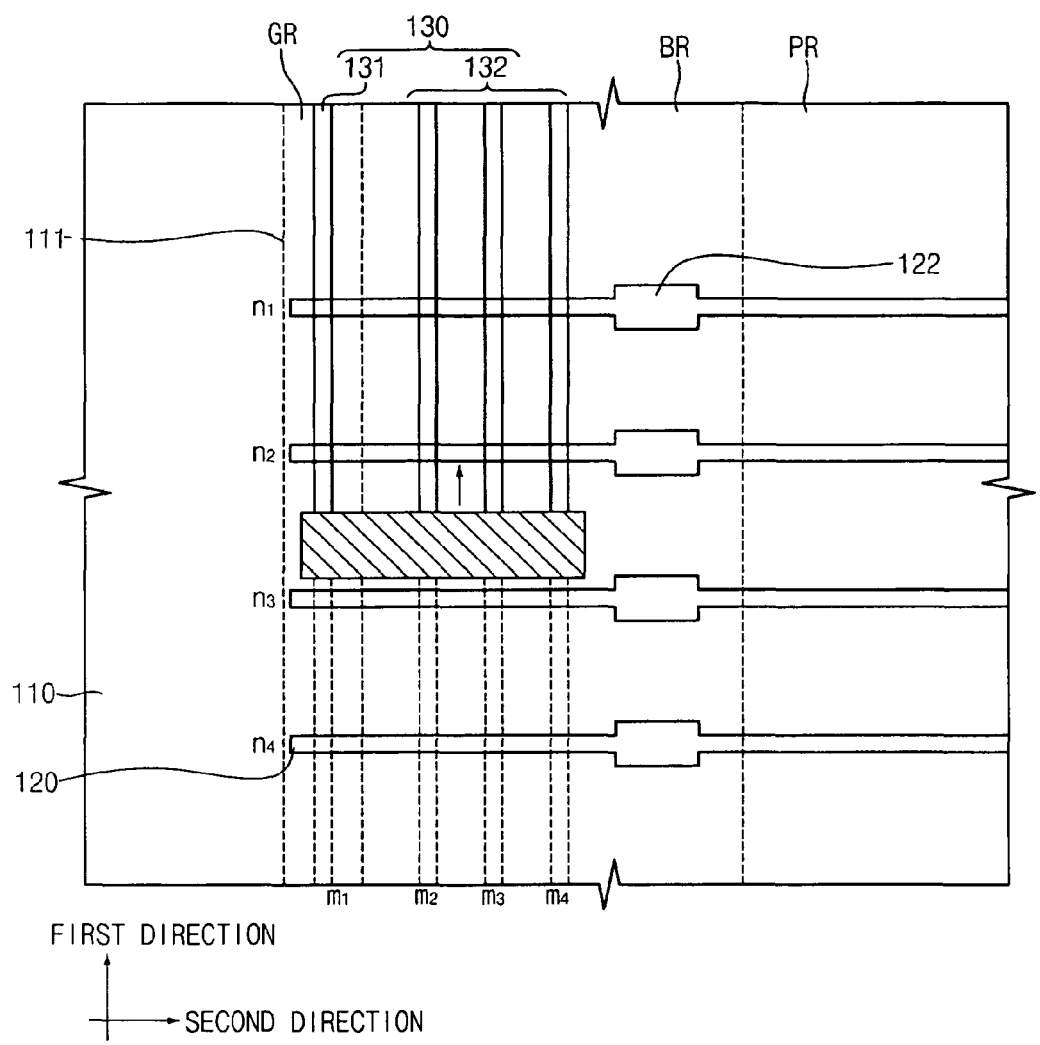
FIG. 13 is a plan view illustrating removing the test lines shown in FIG. 12.

FIG. 13 is a plan view illustrating the removal of the test lines shown in FIG. 12.

Referring to FIG. 13, after the display substrate is tested, the first and second sets of test lines 130 and 135 formed on the substrate 110 are removed. A portion formed on the grinding region GR of the first and second sets of test lines 130 and 135 may be removed through an edge grinding process. Thus, the portion formed on the grinding region GR of the first and second sets of test lines 130 and 135 are not removed through the present process.

A laser beam is irradiated onto the first and second sets of test lines 130 and 135 formed on the substrate 110, thereby removing the first and second sets of test lines 130 and 135. For example, the laser beam burns the first and second sets of test lines 130 and 135 to remove the first and second sets of test lines 130 and 135. Alternatively, the laser beam may melt the first and second sets of test lines 130 and 135 to remove the first and second sets of test lines 130 and 135. The laser beam removing the first and second sets of test lines 130 and 135 has a width of about 50 µm to about 500 µm.

After the first and second sets of test lines 130 and 135 are removed from the substrate 110, the grinding region GR of the substrate 110 is rounded using an edge grinder or a laser beam. The portion of the first and second sets of test lines 130 and 135 formed on the grinding region GR is removed during this grinding step.

When the first and second sets of test lines 130 and 135 are removed from the substrate 100 and the grinding region GR of the substrate 110 is ground, fine particles may be generated. Thus, the substrate 100 is cleansed. This concludes formation of the display substrate.

According to the present invention, pixels formed on a display substrate may be tested more precisely. Thus, defective pixels may be detected more easily and exactly.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A method of manufacturing a display substrate, comprising:

forming signal lines on a substrate including a pixel region, a buffer region surrounding the pixel region, and a grinding region surrounding the buffer region, the signal lines passing from the grinding region through the buffer region to the pixel region, a driving signal being provided to pixels of the pixel region through the signal lines to display an image;

forming test lines intersecting the signal lines on the grinding region and the buffer region, the test lines providing each of the signal lines with a test signal;

providing each of the test lines with the test signal;

irradiating a laser beam along the test lines to remove the test lines formed in the buffer region from the substrate without cutting the substrate; and cutting the substrate along a line between the grinding region and the buffer region to remove the grinding region of the substrate.

2. The method of claim 1, further comprising:
  after forming the signal lines on the substrate, forming an insulation layer on the substrate, the insulation layer insulating each of the signal lines and each of the test lines from each other; and
  forming a contact hole through the insulation layer, the contact hole electrically connecting each of the test lines to the corresponding signal lines.

3. The method of claim 1, wherein at least two test lines are formed when forming the test lines.

4. The method of claim 1, wherein a width of each test line is formed in a range of about 25 μm to about 60 μm.

5. The method of claim 1, wherein an interval between adjacent test lines is formed in a range of about 12 μm to about 60 μm.

6. The method of claim 1, wherein a width of the laser beam is in a range of about 50 μm to about 500 μm.

7. The method of claim 1, further comprising cleansing the substrate after removing the test lines.

8. The method of claim 1, wherein the set of test lines intersect the set of signal lines in a lattice structure.

9. The method of claim 1, further comprising forming an organic layer on the substrate having the test lines, the organic layer exposing the test lines.

10. A method of manufacturing a display substrate, comprising:
  forming signal lines on a substrate including a pixel region, a buffer region surrounding the pixel region, and a grinding region surrounding the buffer region, the signal lines passing from the grinding region through the buffer region to the pixel region, a driving signal being provided to pixels of the pixel region through the signal lines to display an image;
  forming test lines intersecting the signal lines on the grinding region and the buffer region, the test lines providing each of the signal lines with a test signal;
  providing each of the test lines with the test signal;
  removing all of the test lines formed in the buffer region from the substrate by laser without cutting the substrate; and
  cutting the substrate along a line between the grinding region and the buffer region to remove the grinding region of the substrate.

11. The method of claim 10, further comprising:
  after forming the signal lines on the substrate, forming an insulation layer on the substrate, the insulation layer insulating each of the signal lines and each of the test lines from each other; and
  forming a contact hole through the insulation layer, the contact hole electrically connecting each of the test lines to the corresponding signal lines.

12. The method of claim 10, wherein at least two test lines are formed when forming the test lines.

13. The method of claim 10, wherein a width of each test line is formed in a range of about 25 μm to about 60 μm.

14. The method of claim 10, wherein an interval between adjacent test lines is formed in a range of about 12 μm to about 60 μm.

15. The method of claim 10, wherein a width of the laser beam is in a range of about 50 μm to about 500 μm.

16. The method of claim 10, further comprising cleansing the substrate after removing the test lines.

17. The method of claim 10, wherein the set of test lines intersect the set of signal lines in a lattice structure.

18. The method of claim 10, further comprising forming an organic layer on the substrate having the test lines, the organic layer exposing the test lines.

19. A method of manufacturing a display substrate, comprising:
  forming signal lines on a substrate including a pixel region, a buffer region surrounding the pixel region, and a grinding region surrounding the buffer region, the signal lines passing from the grinding region through the buffer region to the pixel region, a driving signal being provided to pixels of the pixel region through the signal lines to display an image;
  forming test lines intersecting the signal lines on the grinding region and the buffer region, the test lines providing each of the signal lines with a test signal;
  providing each of the test lines with the test signal;
  irradiating a laser beam along the test lines to remove all of the test lines formed in the buffer region from the substrate without cutting the substrate; and
  cutting the substrate along a line between the grinding region and the buffer region to remove the grinding region of the substrate.

* * * * *